US006668020B2

(12) United States Patent
Ma et al.

(10) Patent No.: US 6,668,020 B2
(45) Date of Patent: Dec. 23, 2003

(54) METHOD FOR MOTION ESTIMATION IN VIDEO CODING

(75) Inventors: Shyh-Yih Ma, Taipei (TW); Chun-Fu Shen, Taipei (TW)

(73) Assignee: Vivotek Inc., Taipei (TW)

( * ) Notice: Subject to any disclaimer, the term of this patent is extended or adjusted under 35 U.S.C. 154(b) by 276 days.

(21) Appl. No.: 09/794,119

(22) Filed: Feb. 28, 2001

(65) Prior Publication Data

US 2002/0054642 A1 May 9, 2002

(30) Foreign Application Priority Data

Nov. 4, 2000 (TW) ......................................... 89123319 A

(51) Int. Cl.[7] .................................................. H04N 7/18
(52) U.S. Cl. .............................. 375/240.16; 375/240.17
(58) Field of Search ........................ 375/240.12–240.17

(56) References Cited

U.S. PATENT DOCUMENTS

| | | | | |
|---|---|---|---|---|
| 5,930,403 A | * | 7/1999 | Sperling et al. | 382/276 |
| 5,973,742 A | * | 10/1999 | Gardyne et al. | 375/240.15 |
| 6,360,015 B1 | * | 3/2002 | Bakhmutsky et al. | 382/236 |
| 6,438,170 B1 | * | 8/2002 | Hackett et al. | 375/240.16 |
| 6,483,876 B1 | * | 11/2002 | Chang et al. | 375/240.16 |

* cited by examiner

*Primary Examiner*—Andy Rao
(74) *Attorney, Agent, or Firm*—Rabin & Berdo, P.C.

(57) ABSTRACT

A method for motion estimation for use in video coding. In a predetermined search region, three starting rows are chosen, wherein a given prediction point is on the middle row, the N-th row. The method includes the following steps. (a) All points of the (N−2)-th, N-th, and (N+2)-th rows are chosen as checking points. (b) Block match errors for the checking points are calculated and a checking point which corresponds to a minimum block match error is defined as a candidate checking point. (c) A determination is made whether the candidate checking point is on the N-th row; if so, the method proceeds to step (g); otherwise, it proceeds to step (d). (d) It is determined that whether the candidate checking point is on the (N+2)-th row; if so, the method proceeds to step (e); otherwise, it proceeds to step (f). (e) N is incremented by two, all points of the (N+2)-th row are chosen as checking points, and step (b) is repeated. (f) N is decremented by two, all points of the (N−2)-th row are chosen as checking points, and step (b) is repeated. (g) All points of the (N−1)-th and (N+1)-th rows are chosen as checking points, block match errors for the checking points are calculated, and a checking point corresponding to the minimum block match error is defined as the candidate checking point, wherein the candidate checking point is used for determining the motion vector for video coding.

5 Claims, 14 Drawing Sheets

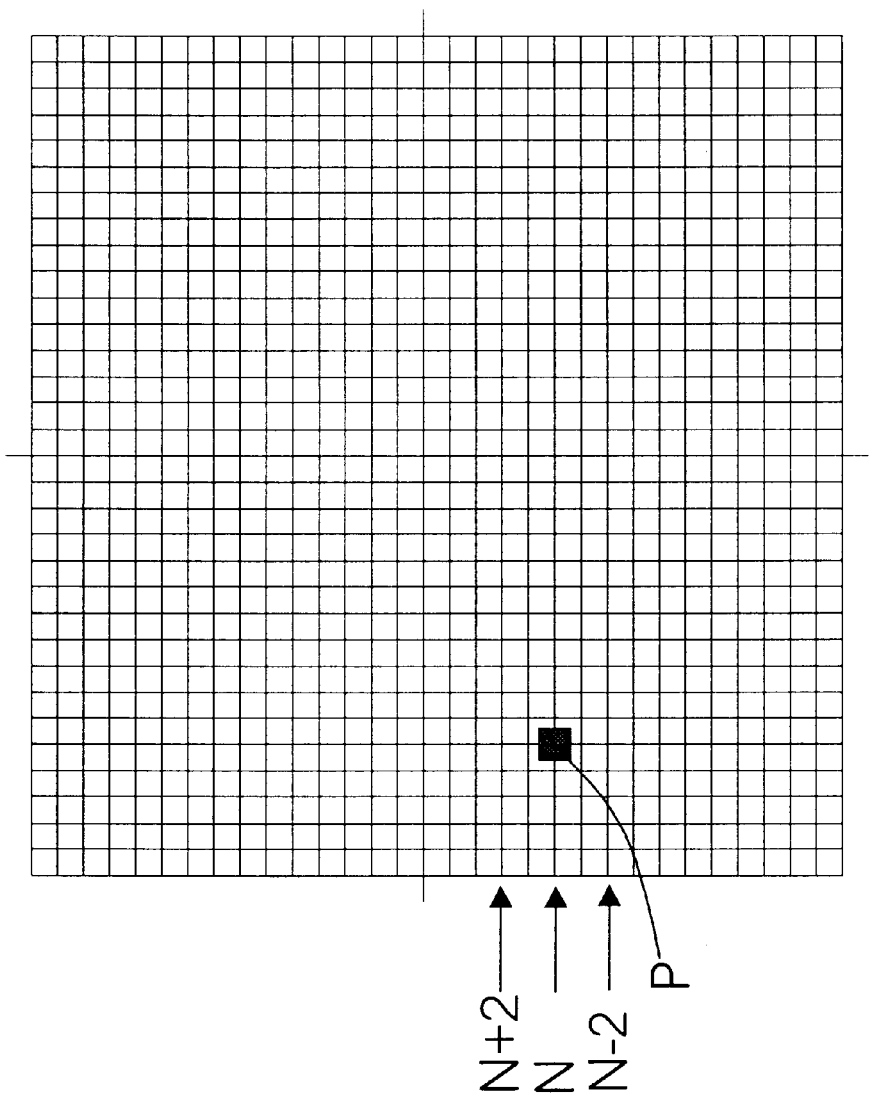

METHOD FOR MOTION ESTIMATION IN VIDEO CODING

This application incorporates by reference Taiwanese application Serial No. 89123319, filed on Nov. 4, 2000.

BACKGROUND OF THE INVENTION

1. Field of the Invention

The invention relates in general to a method for motion estimation in video coding, and more particularly to a block-matching motion estimation method for motion compensated video coding.

2. Description of the Related Art

In conventional motion compensated video coding, when a current frame is to be processed, it involves computation of a motion vector by using a previous frame or a reference frame and then the current frame is processed. The motion vector is produced by a motion estimation technique. Among motion estimation techniques, a block matching motion estimation technique is frequently used, wherein the smallest estimation unit is a block of a frame.

Referring to FIG. 1, it illustrates a conventional motion compensated video coding. In FIG. 1, block 104 of frame 102 is coded as follows. First, it needs to determine a block, such as block 108, which matches block 104 best and makes less difference to block 104, by using a block matching motion estimation technique with a previous frame 106. Then, a motion vector is obtained by computing the difference in coordinates between the pixels of block 104 in frame 102 and the pixels of block 108 in frame 106. Next, this motion vector and the difference in image information between block 104 and block 108 are coded. In this way, for transmitting the image data of frame 102, the data encoded by the technique above are actually transmitted and significantly reduced in quantity as compared with other technique in which block 104 is required to be coded entirely.

A conventional block matching motion estimation technique is the fill search technique. By the full search technique, a complete test is performed, resulting in the best-matching block for a current frame. Referring to FIG. 2, it illustrates the conventional full search motion estimation technique. When block 104 is to be coded, the method for searching the best-matching block in the previous frame 106 by using the full search technique is as follows.

First, determine search region 202 corresponding to frame 106, where the size of search region 202 can be determined according to the characteristics of the image data of frames 102 and 106. In search region 202, there are M by M checking points, each of which corresponds to a block of frame 106. For example, referring to FIG. 2B, it illustrates the relationship between checking points and their respective blocks. In FIG. 2B, checking points C, C1, and C2 correspond to blocks 204, 206, and 208 of the previous frame 106 respectively. If checking point C moves right and upward by one pixel, it becomes checking point C1. In this way, when the region indicated by block 204 is shifted right and upward by one pixel, it results in the region indicated by block 206.

Secondly, computation of the differences in image information of all pixels between the blocks corresponding to all checking points and block 104 of the current frame 102 is performed.

Next, a block match error is determined by summing the absolute values of the differences in image information for one block.

Then, it is to determine the block corresponding to the minimum block match error by using the block match errors determined, wherein the block determined to have the minimum block match error is the best-matching block in the previous frame 106, such as block 108 in this example.

After that, a motion vector for block 104 is obtained by the checking point that corresponds to the best-matching block in the previous frame 106, block 108.

In the full search motion estimation technique, checking points are consecutively determined in a search region so that the arrangement of the blocks corresponding to the checking points is in consecutive order and two consecutive blocks overlap. In this way, when performing a full search for a best-matching block, many image data may be reused. Referring to FIG. 2C, it illustrates image data reuse when performing a full search. In FIG. 2C, three consecutive checking points in a row correspond to blocks 210, 212, and 214. During performing computation on each pixel of block 212, it only needs to load the image data of block 212 which correspond to the portion that does not overlap block 210. Similarly, during performing computation on each pixel of block 214, it is only required loading the image data of block 214 which correspond to the portion that does not overlap block 212. Consequently, a small amount of data is loaded in computation for each block. By hardware design, the function of data reuse can be achieved. In this way, most media processors for performing video coding generally support speed-up hardware to improve the performance when performing full search motion estimation.

However, the full search motion estimation technique involves a huge amount of complex computation. It consumes time to perform and thus the performance is low. Therefore, for a better performance, many block matching motion estimation techniques have been developed. Referring to FIG. 3, it illustrates one block matching motion estimation technique called three step search (TSS) technique. First, nine checking points are taken, wherein eight of them form an 8×8 pixels square, such as square 302, with the remaining checking point, such as checking point P, as the square's center point. Then, the block match errors for the blocks corresponding to all checking point of square 302 are calculated, and from the checking points taken from square 302, the checking point corresponding to the minimum block match error calculated can be determined, such as checking point P1 in square 302. Next, from a 4-by-4-pixel square, such as square 304, with checking point P1 as its center point, eight checking points are taken and the checking point corresponding to the minimum block match error can be determined, such as checking point P2. Finally, from the eight checking points adjacent to checking point P2, the checking point that corresponds to the block with the minimum block match error is determined, such as checking point P3. In this way, a motion vector can be determined by using checking point P3.

In the three step search technique, the number of checking points employed in the process of determination of a motion vector is less than the full search technique so that the amount of computation in the three step search technique does as well. However, performance of the three step search technique is not completely accepted. By the three step search technique, the point check for obtaining the motion vector is determined through only three steps, it is probably that the checking point corresponding to the best-matching block cannot be found. Besides, as can be seen from the example above, the distribution of the checking points is non-uniform. Thus, it cannot be benefited from the hardware's speed-up, as the full search technique does, to speed up the processing rate.

In addition, another block matching motion estimation technique, called diamond search technique, has been widely used. Referring to FIG. 4, it illustrates the conventional diamond search technique. First, nine checking points are taken, wherein eight of them form a rhombus, such as rhombus 402, with the remaining checking point such as D, as the rhombus's center point and the diagonals of the rhombus are of four pixels length. Second, the block match errors corresponding to all checking points taken from rhombus 402 are calculated and checking point D1 is determined as the checking point corresponding to the minimum block match error. Since checking point D1 is not the center point D1 rhombus 402, eight checking points are taken from rhombus 404 with checking point D1 as the center point and with diagonals of four pixels length and, from the eight checking points from rhombus 404, checking point D2 is determined as the checking point corresponding to the minimum block match error. Since checking point D2 is not the center point of rhombus 404, eight checking points is taken from rhombus 406 with checking point D2 as the center point and with diagonals of four pixels length, and the checking point corresponding to the minimum block match error is to be determined from the eight checking points from rhombus 406. If it is determined that checking point D2, the center point of rhombus 406, is the checking point corresponding to the minimum block match error for rhombus 406, four checking points are taken from the rhombus 408 with checking point D2 as the center point and with diagonals of two pixels length and, from the four checking points from rhombus 408, checking point D3 is determined as the checking point corresponding to the minimum block match error. In this way, a motion vector can be determined by using checking point D3.

By the diamond search technique, since the block match error corresponding to the checking point, such as checking point D3 in the example above, is the local minimum block match error. Thus, the performance is acceptable. In addition, the diamond search technique provides low complexity. However, in this technique, since the sequence of access to data is irregular, so that data reuse cannot be achieved and its performance cannot be benefited from the speed-up function supported by the hardware. Besides, because of the irregular sequence of access to data, a lot of time is consumed in selection, determination, and calculation of data's address, and the time taken in these control actions significantly affects the processing rate of the diamond search technique.

SUMMARY OF THE INVENTION

It is therefore an object of the invention to provide a method for video coding motion estimation. By the invention, it is to achieve high quality, low complexity, capability of data reuse and capability of utilizing speed-up hardware supported by most media processors to increase the processing rate of video coding.

The invention achieves the above-identified objects by providing a method for motion estimation for use in video coding and when a first block in a current frame is coded, the method is used for searching for a second block in a previous frame matching the first block in the current frame. The second block is used for determining a motion vector, in a predetermined search region, for the first block. In the predetermined search region, there are a number of rows and the number of rows including an (N−2)-th row, an (N−1)-th row, an N-th row, an (N+1)-th row, and an (N+2)-th row, each of the rows having a number of points, wherein a prediction point is on the N-th row. The method includes the following steps. (a) All points of the (N−2)-th row, the N-th row, and the (N+2)th row are chosen as checking points. (b) Block match errors for the checking points are calculated and a checking point which corresponds to a minimum block match error is defined as a candidate checking point. (c) A determination is made whether the candidate checking point is on the N-th row; if the candidate checking point is on the N-th row, the method proceeds to step (g); otherwise, the method proceeds to step (d). (d) It is determined that whether the candidate checking point is on the (N+2)-th row; if the candidate checking point is on the (N+2)-th row, the method proceeds to step (e); otherwise, the method proceeds to step (f). (e) N is incremented by two, all points of the (N+2)-th row are chosen as checking points, and step (b) is repeated. (f) N is decremented by two, all points of the (N−2)-th row are chosen as checking points, and step (b) is repeated. (g) All points of the (N−1)-th and the (N+1)-th rows are chosen as checking points, block match errors for the checking points are calculated, and a checking point corresponding to the minimum block match error is defined as the candidate checking point, wherein the candidate checking point corresponds to the second block and is used for determining the motion vector for the first block.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIGS. 6A–6F illustrate an example of application of the video coding motion estimation.

DESCRIPTION OF THE PREFERRED EMBODIMENT

When a block of a current frame is processed for video coding, according to the invention, a method for motion estimation for use in video coding is provided for finding a matching block from the blocks of a previous frame, for determining a motion vector, in a search region, for the block of the current frame. Before performing the motion estimation method according to the motion estimation, the search region has to be determined, wherein the search region includes a number of rows and a number of columns. The row on which a prediction point P lies is defined as an N-th row. The prediction point P can be obtained by using a motion vector corresponding to a block that is near the block of the current frame and has been coded.

Figure 1:
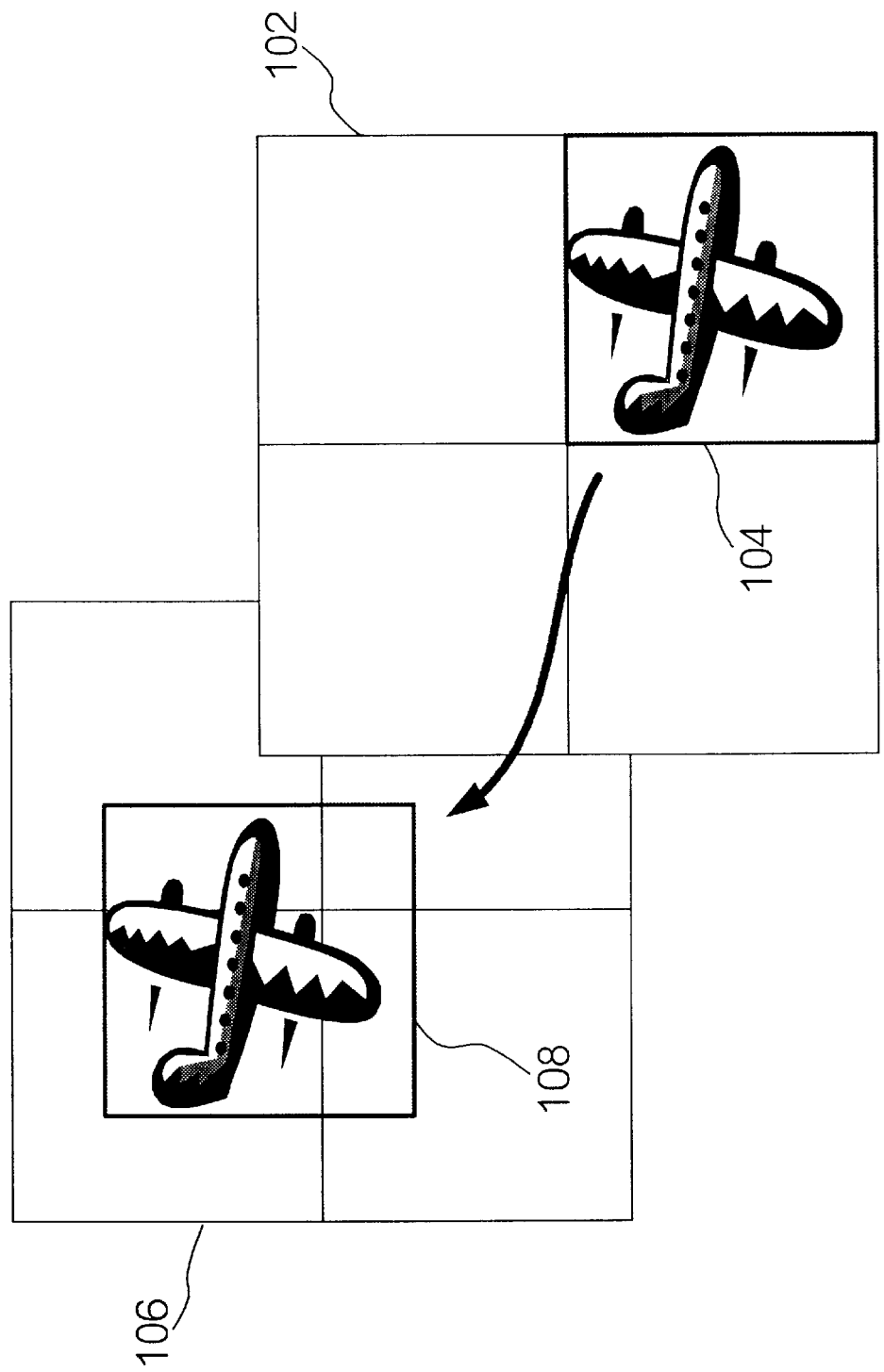
FIG. 1 illustrates conventional motion compensated video coding.
Figure 2A:
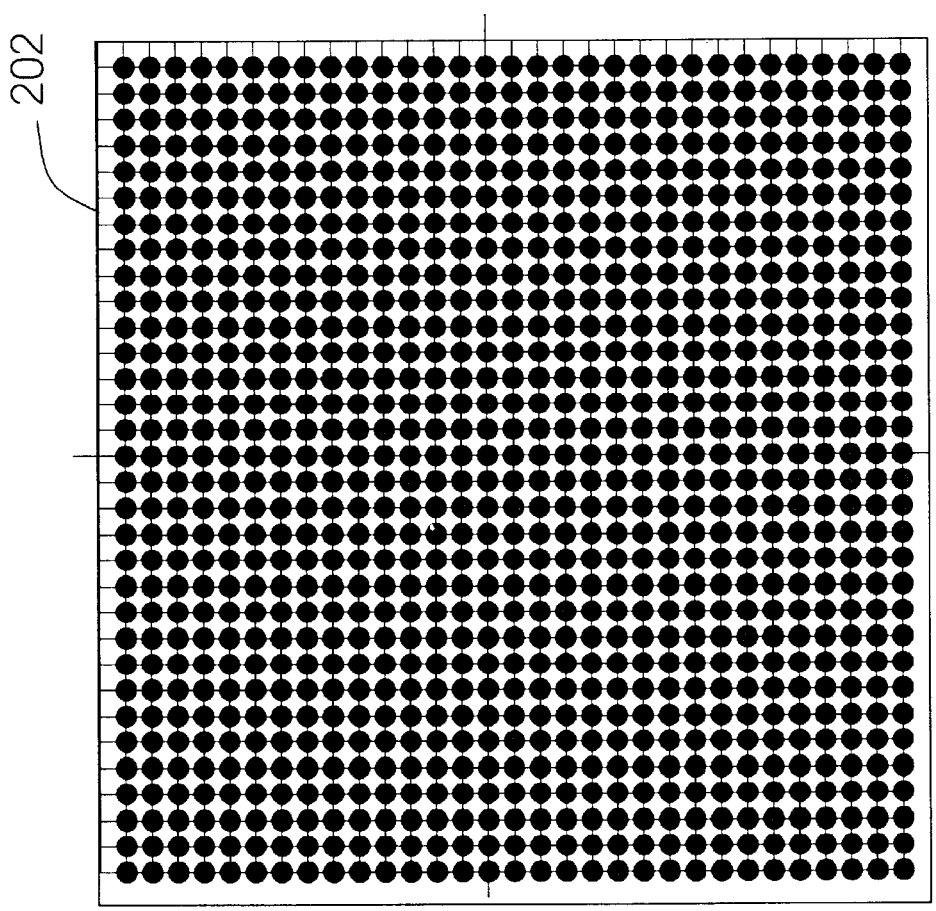
FIG. 2A illustrates conventional full search motion estimation technique.
Figure 2B:
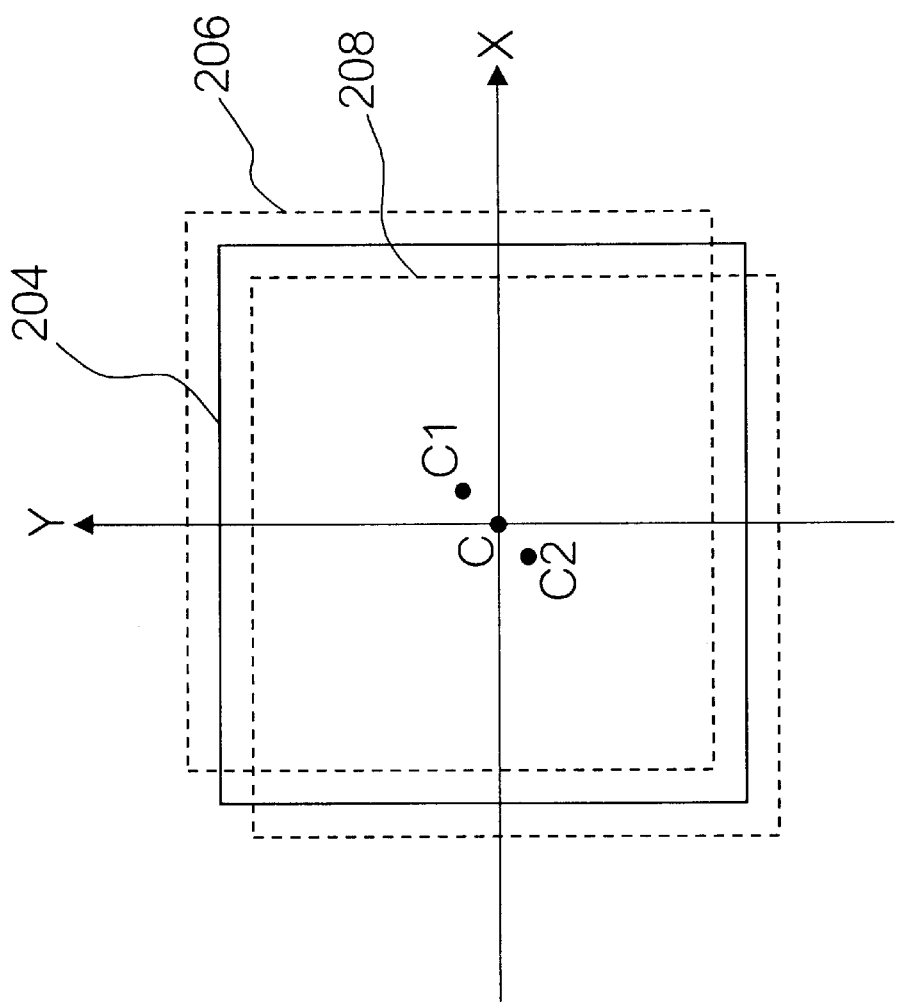
FIG. 2B illustrates the relationship between checking points and their respective blocks.
Figure 2C:
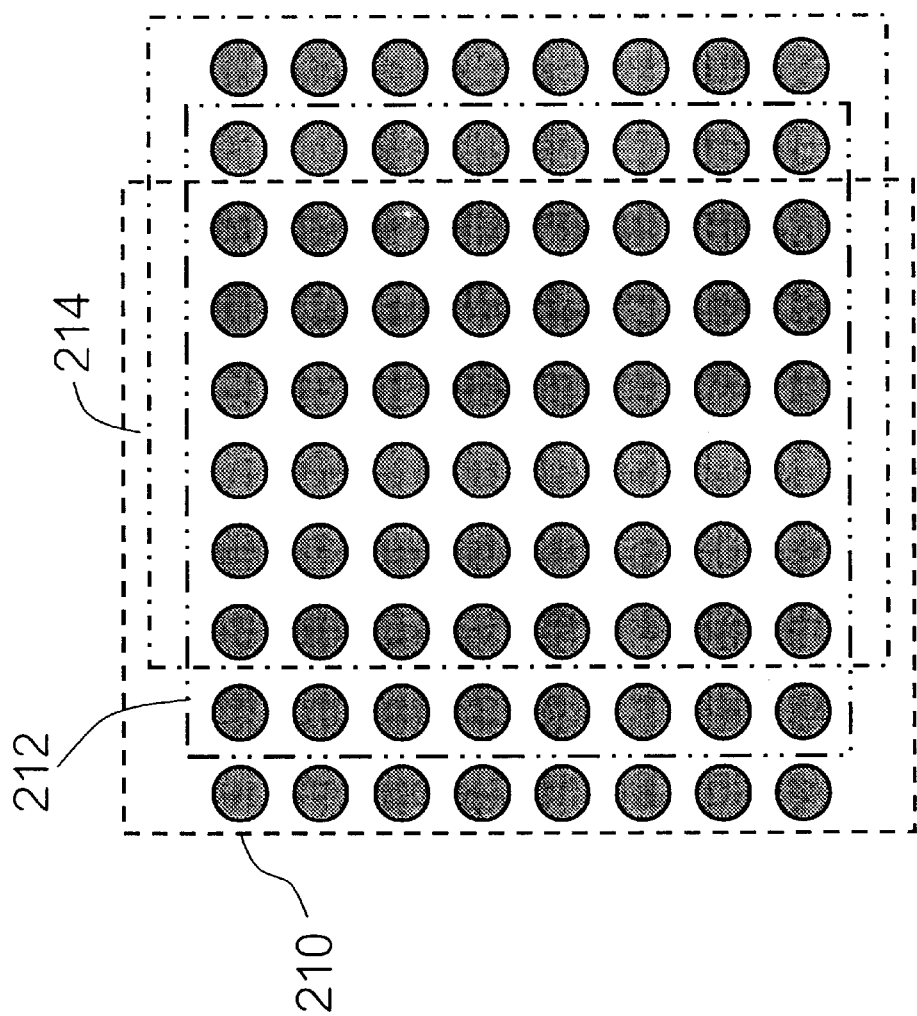
FIG. 2C illustrates image data reuse when performing the full search.
Figure 3:
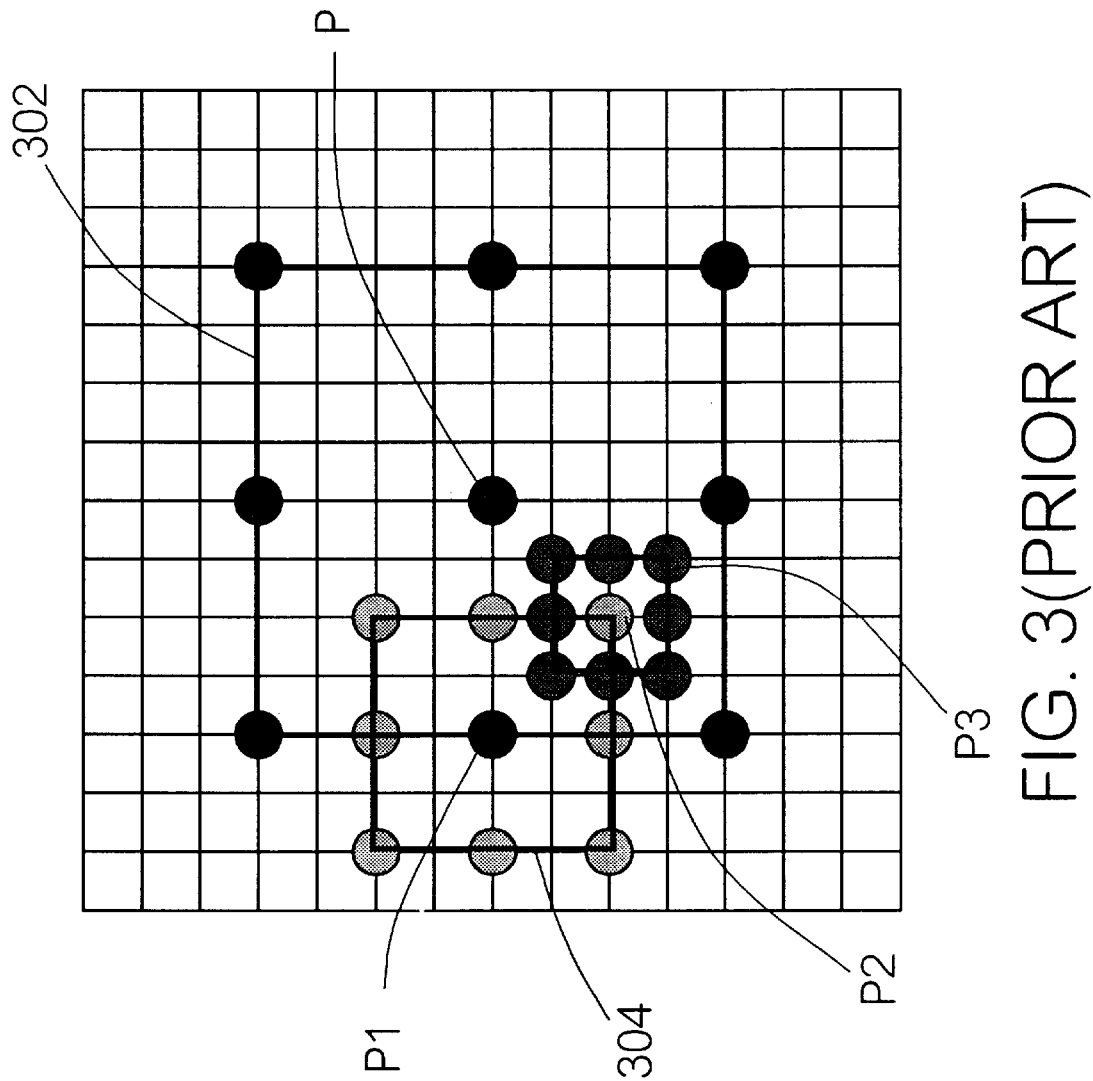
FIG. 3 illustrates conventional three step search technique.
Figure 4:
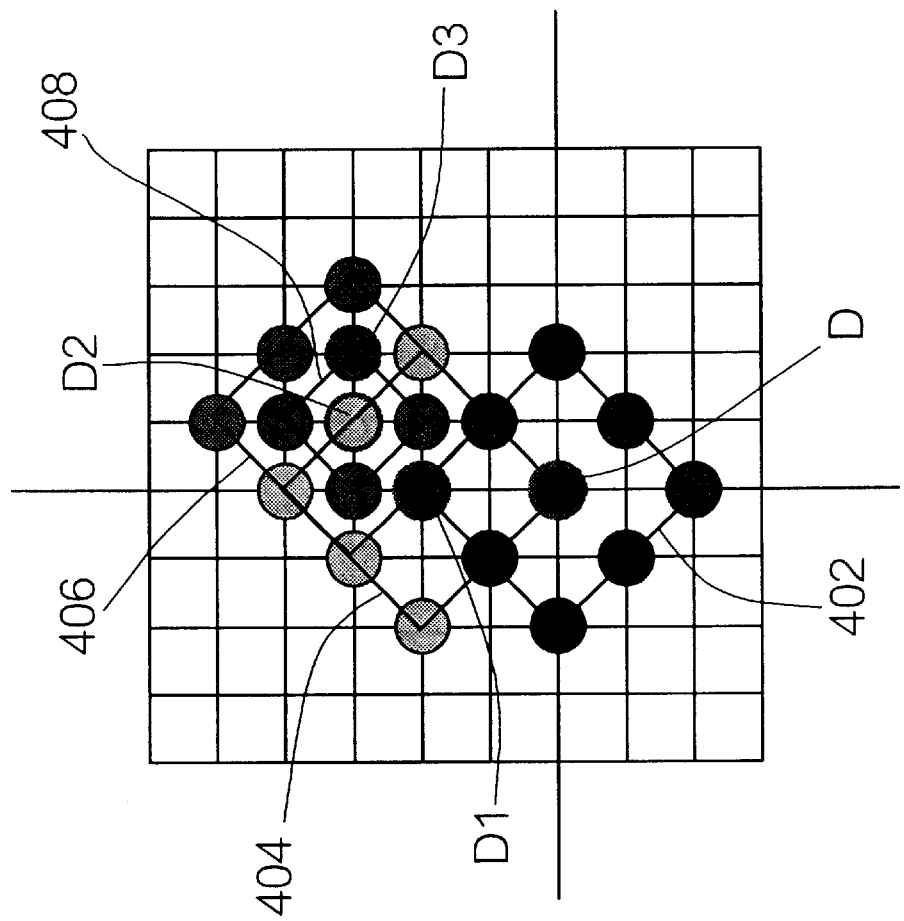
FIG. 4 illustrates conventional diamond search technique.
Figure 5:
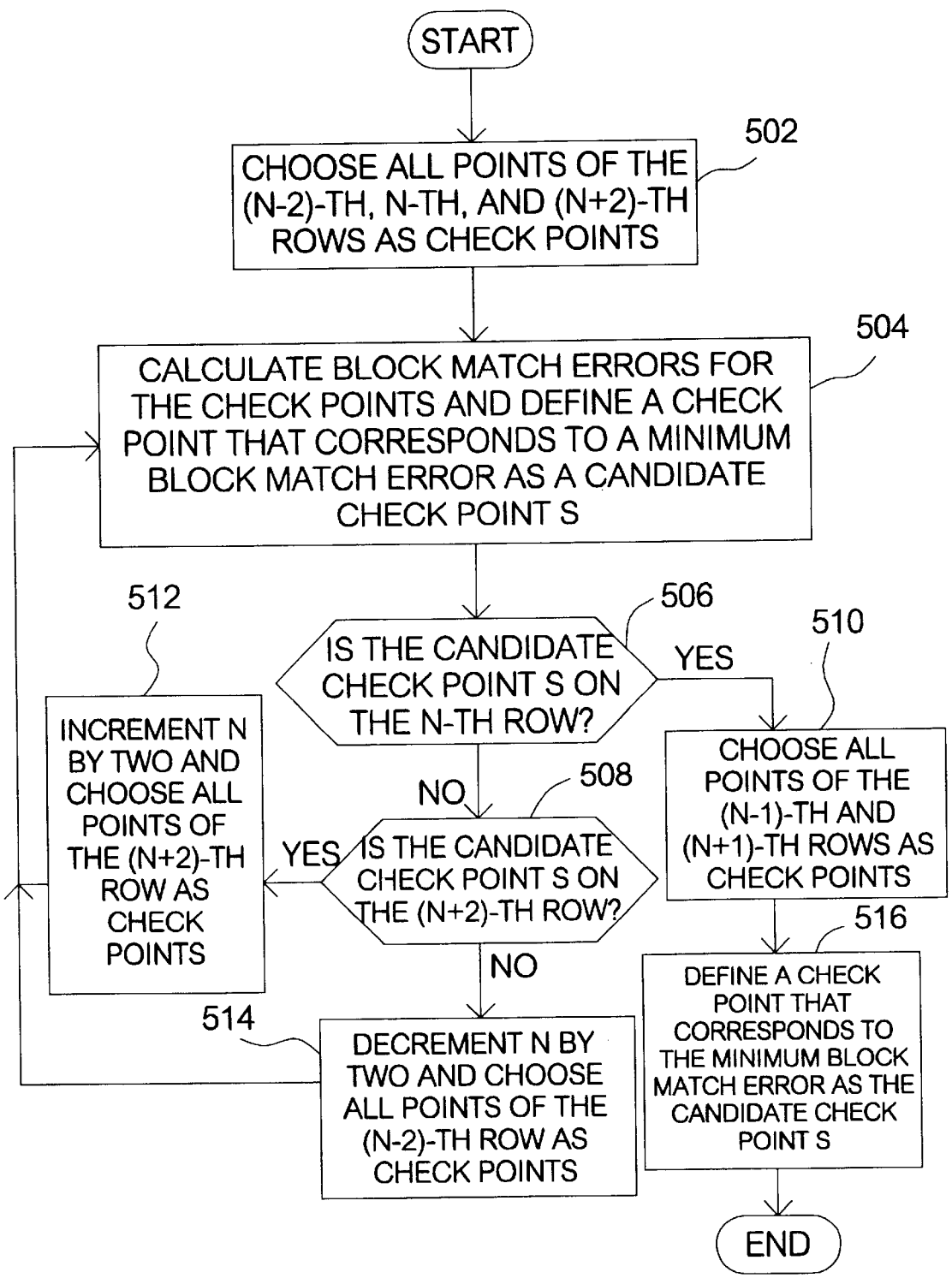
FIG. 5 is a flow chart illustrating a preferred embodiment of a video coding motion estimation according to the invention.

Referring to FIG. 5, it illustrates a preferred embodiment of the video coding motion estimation method according to the invention in a flow chart. In the beginning of the method, step 502 is performed, where all points of the (N−2)-th row, the N-th row, and the (N+2)-th row are chosen as checking points.

The method then proceeds to step 504. In step 504, block match errors for the checking points are calculated and a checking point that corresponds to a minimum of the block match errors is defined as a candidate checking point S. This can be done by calculating differences in image information of all pixels between each of the blocks corresponding to the checking points of the (N−2)-th row, the N-th row, the (N+2)-th row in the previous frame and the first block in the current frame. Next, for each of the blocks corresponding to the checking points, the block match error is obtained by summing up absolute values of the differences corresponding to the block. Thus, the block match errors corresponding to the checking points are obtained. Then, a minimum of the block match errors is to be determined. The checking point corresponding to the minimum block match error is defined as a candidate checking point S.

Then, the method proceeds to step 506 to determine whether the candidate checking point S is on the N-th row. If so, the method proceeds to step 510; otherwise, the method proceeds to step 508.

Next, in step 508, a determination is made whether the checking point S is lying on the (N+2)-th row. If so, the method proceeds to step 512. If not, the method proceeds to step 514, which indicates the checking point S is in the (N−2)-th row.

In step 512, N is incremented by two, and all points of the (N+2)-th row are chosen as checking points. Namely, all points of the second row above the three rows in step 502 are chosen as the checking points. Then, step 504 is repeated so that block match errors corresponding to the checking points of the (N+2)-th row are calculated, and a minimum block match error is then determined from the block match errors corresponding to the checking points of the N-th and (N+2)-th rows. The checking point corresponding to the minimum block match error is chosen as the candidate checking point S. After repeating step 504, the method proceeds to step 506.

In step 514, N is decremented by two, and all points of the (N−2)-th row are chosen as checking points. Namely, all points of the second row below the three rows taken in step 502 are chosen as the checking points. Then, step 504 is repeated so that block match errors corresponding to the checking points of the (N−2)-th row are calculated, and a minimum block match error is then determined from the block match errors corresponding to the checking points of the N-th and (N−2)-th rows. The checking point corresponding to the minimum block match error is chosen as the candidate checking point S. After repeating step 504, the method proceeds to step 506.

In step 506, if it is determined that the candidate checking point S is on the N-th row, step 510 is performed. In step 510, all points of the (N−1)-th and (N+1)-th rows are chosen as checking points, and the method proceeds to step 516. In step 516, block match errors corresponding to the checking points of the (N−1)-th and (N+1)-th rows are calculated and a minimum block match error is then determined from the block match errors corresponding to the checking points of the (N−1)-th, N-th, and (N+1)-th rows, wherein the minimum block match error is chosen as the candidate checking point S. In this way, the method is ended and the candidate checking point S can be used for determining the motion vector for the block in the current frame, wherein the candidate checking point S corresponds to the best matching block in the previous frame for the block in the current frame being coded.

Figure 6B:
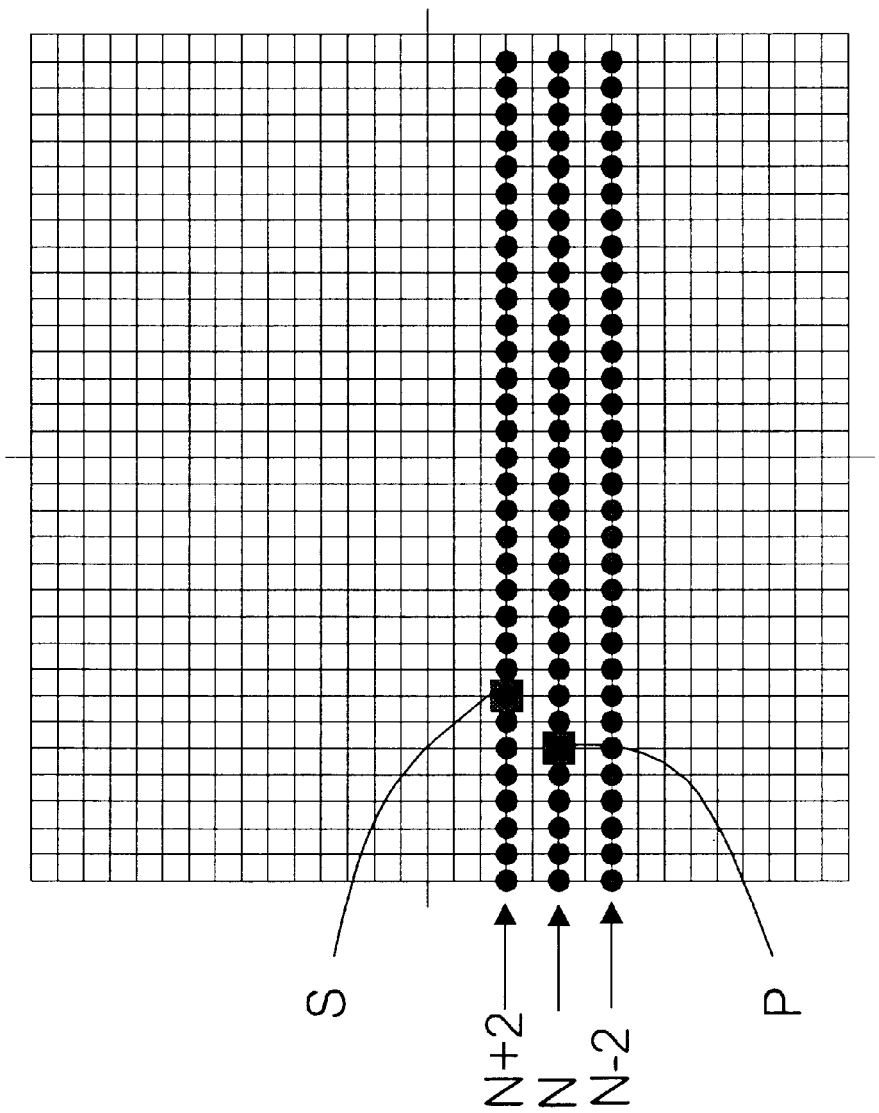

Referring to FIGS. 6A–6F, it illustrates an example of application of the motion estimation method according to the invention for use in video coding, wherein the search range is (−16, 15) and a 32-by-32 search region is employed. It is noted that the search range and search region can be of any ranges or sizes according to the characteristics of the video sequence and the application's requirements. In the search region as shown in FIG. 6A, the row which the prediction point P is on is chosen and defined as the N-th row. Then, all points of the (N−2)-th row, the N-th row, and the (N+2)-th row are chosen as checking points as shown in FIG. 6B and block match errors corresponding to the checking points of the three rows are calculated respectively. Next, from the block match errors corresponding to the checking points calculated in the previous step, a minimum block match error is determined, wherein the checking point corresponds to the minimum block match error is chosen as the candidate checking point S. In this stage, it is assumed that the candidate checking point S is on the (N+2)-th row.

Figure 6C:
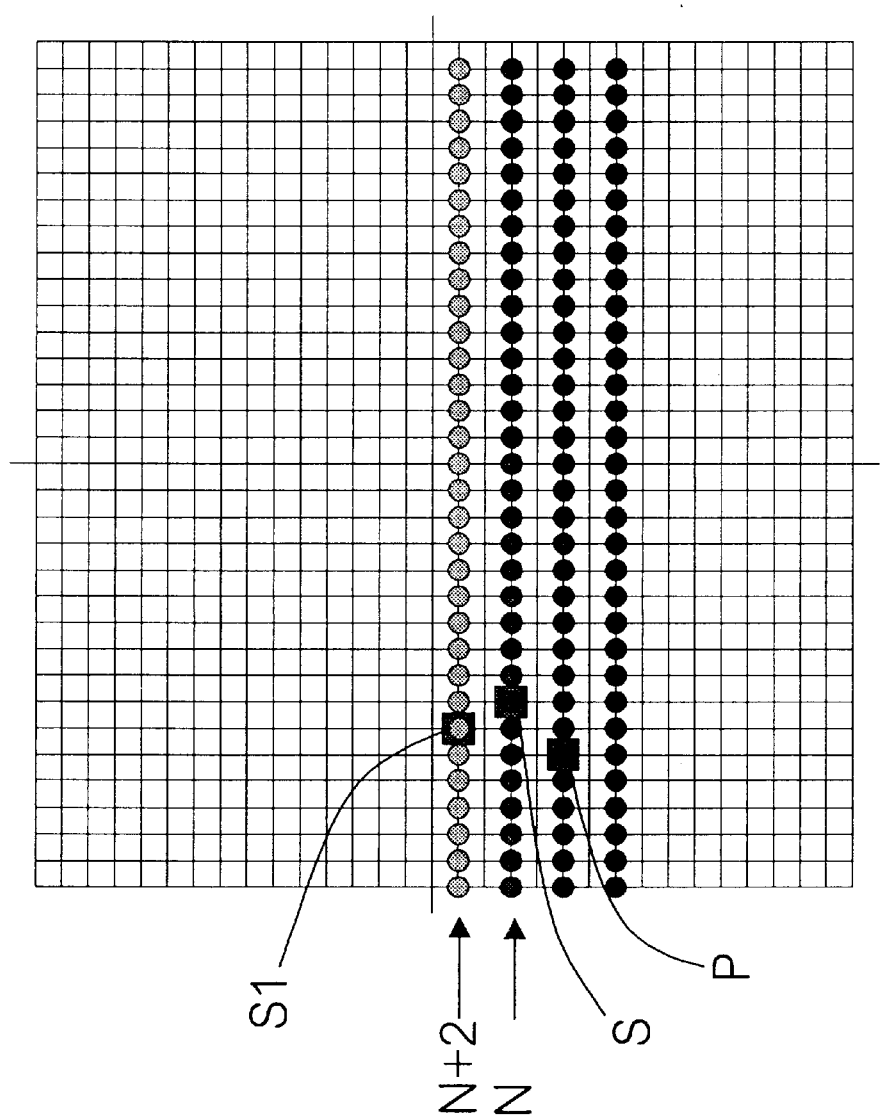

By step 506, since the candidate checking point S lies on the (N+2)-th row, the method proceeds to step 508 and then step 512. As shown in FIG. 6C, the row that the candidate checking point S lies on is redefined as the N-th row and then the points of the (N+2)-th row are chosen as checking points. After block match errors corresponding to the checking points of the (N+2)-th row are calculated, from the block match errors calculated, a minimum block match error is determined, wherein the checking point corresponds to the minimum block match error is chosen as the candidate checking point S1. In this stage, it is assumed that the candidate checking point S1 is on the (N+2)-th row.

Figure 6D:
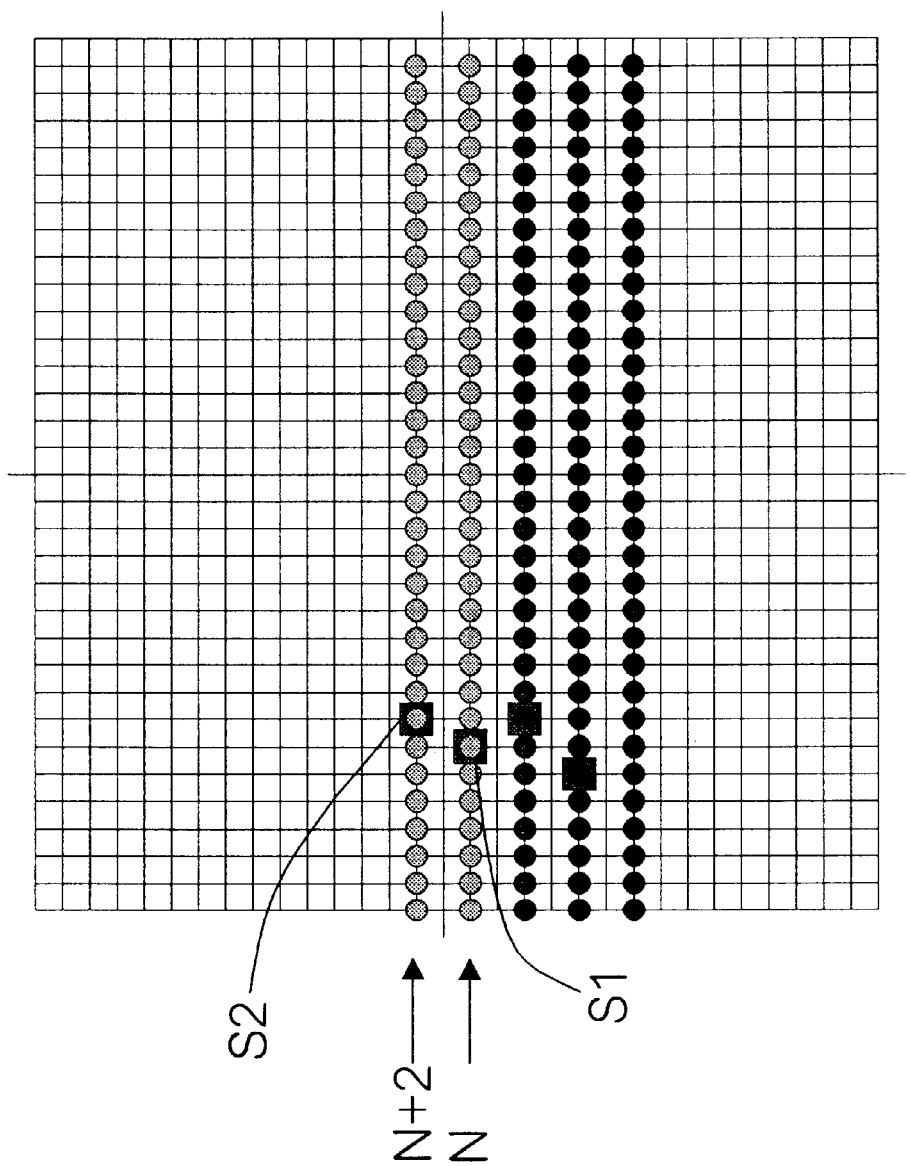

Likewise, the candidate checking point S1 is on the (N+2)-th row, so the row that the candidate checking point S1 is on is redefined as the N-th row, as shown in FIG. 6D, and, after the redefining, all points of the (N+2)-th row are chosen as checking points. After block match errors corresponding to the checking points of the (N+2)-th row are calculated, from the block match errors calculated, a minimum block match error is determined, wherein the checking point corresponds to the minimum block match error is chosen as the candidate checking point S2. In this stage, it is assumed that the candidate checking point S2 is on the (N+2)-th row.

Figure 6E:
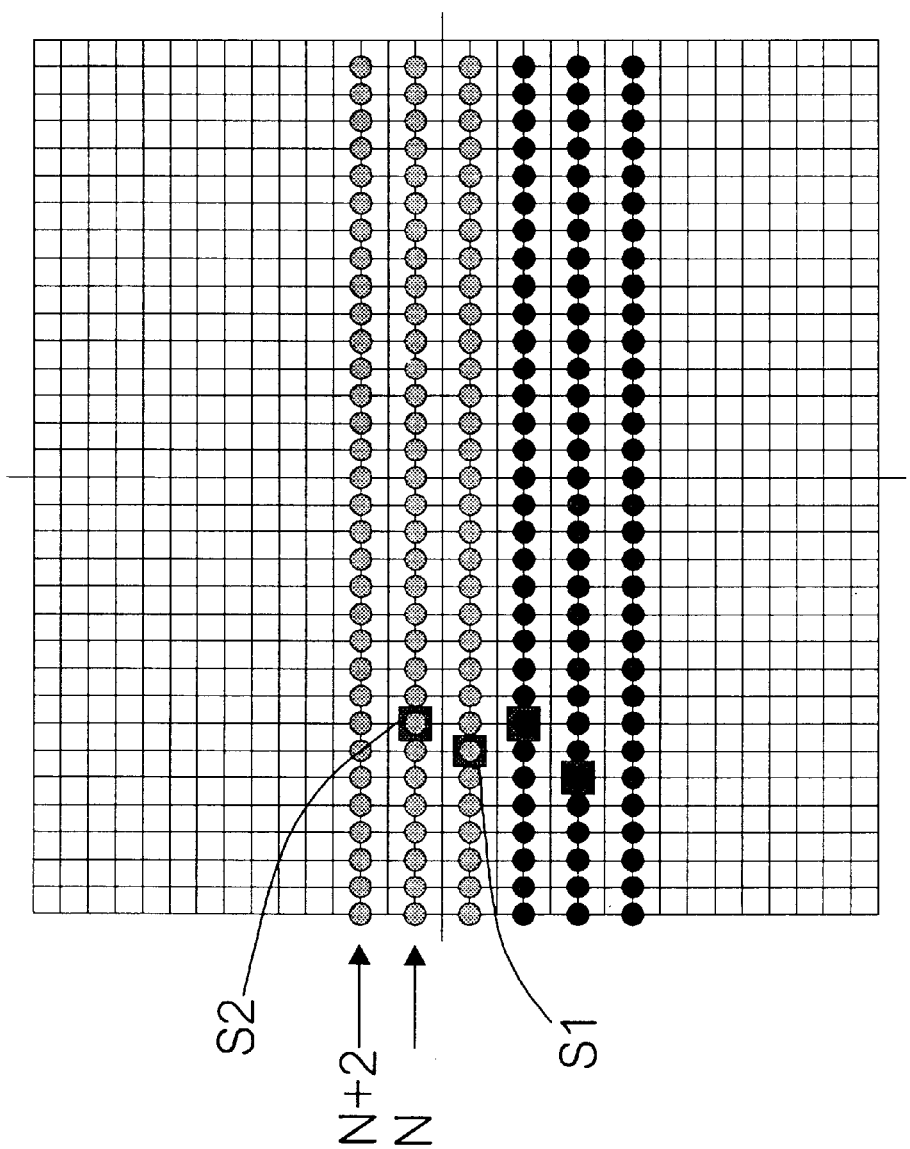

Since the candidate checking point S2 is on the (N+2)-th row, the row that the candidate checking point S2 is on is redefined as the N-th row, as shown in FIG. 6E, and, after the redefining, all points of the (N+2)-th row are chosen as checking points. After block match errors corresponding to the checking points of the (N+2)-th row are calculated, from the block match errors calculated, a minimum block match error is determined. If the checking point corresponds to the minimum block match error is still the candidate checking point S2, which is on the N-th row, by the determination in step 506, step 510 is to be performed. In step 510, all points of the (N−1)-th and (N+1)-th rows are chosen as checking points, and the method proceeds to step 516. In step 516, block match errors of the checking points of the (N−1)-th and (N+1)-th rows are calculated and the block match errors are taken for finding a minimum block match error, wherein the minimum block match error is chosen as the candidate checking point S3. In this way, the method is ended and the candidate checking point S3 is to be used for determining the motion vector for the block in the current frame.

Generally, motion of objects in a video sequence is probably horizontal movement. In this way, by the invention, the points of several rows are chosen as checking points and adjustment of the searching for the candidate checking point is performed in the horizontal direction. In addition, by the invention, since data access is regular, data reuse can be applied and video data to be loaded is reusable. In this way, the speed-up hardware function in a media processor can be employed during motion estimation according to the invention, wherein the speed-up hardware function indicates the functions of consecutive searching in horizontal direction supported by most media processors. Besides, the media processors includes a number of wide registers for data reuse and a number of arithmetic logic units (ALUs) which is capable of generating a multiple data paths for parallel processing for speeding up the processing rate.

According to simulations using the method for motion estimation provided by the invention in video coding with the Foreman sequence in common intermediate format (CIF) format as input video sequence, it shows the following performance results. The average number of rows that are searched for a checking point which is to determine a motion vector is 5.5 rows, i.e. by applying the invention, it takes a few steps to obtain a final candidate checking point for determining a motion vector. In the same conditions with the search range of (−16, 15), the method according to the invention is about six times faster than the full search technique. Compared with the three step search technique, the method according to the invention has a feature that the checking points are chosen in a regular pattern so that the pattern of loading video data is of reduced complexity and thus data reuse can be employed. In addition, unlike the three step search technique and fast search technique, the method according to the invention determines and selects the video data in a way that is not restricted to only using software. Besides, by using the invention to video coding, the peak signal to noise ratio (PSNR) is 0.19 dB lower than the result of the full search technique on average for the Foreman sequence. Therefore, high quality video is achieved by using the invention in video coding.

Figure 6F:
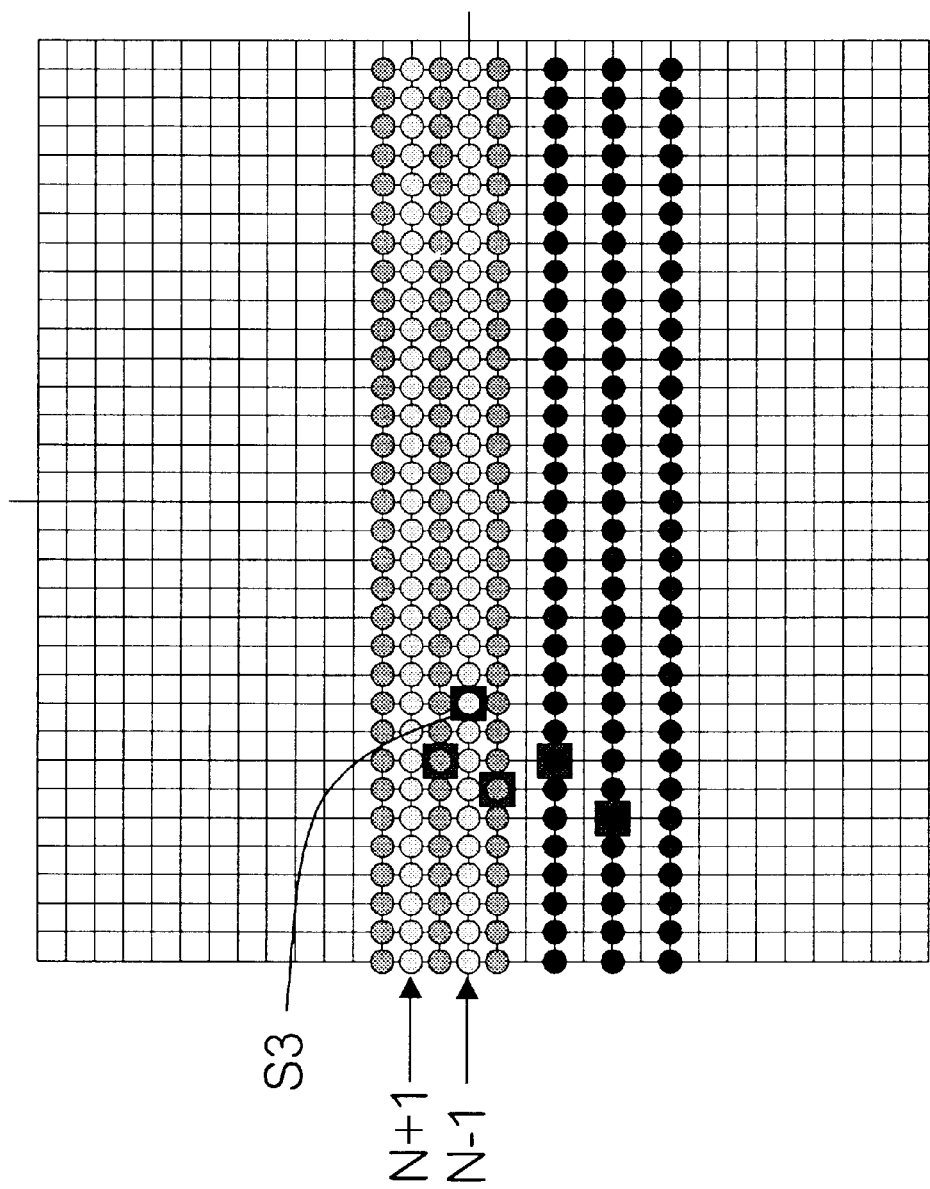
Figure 7:
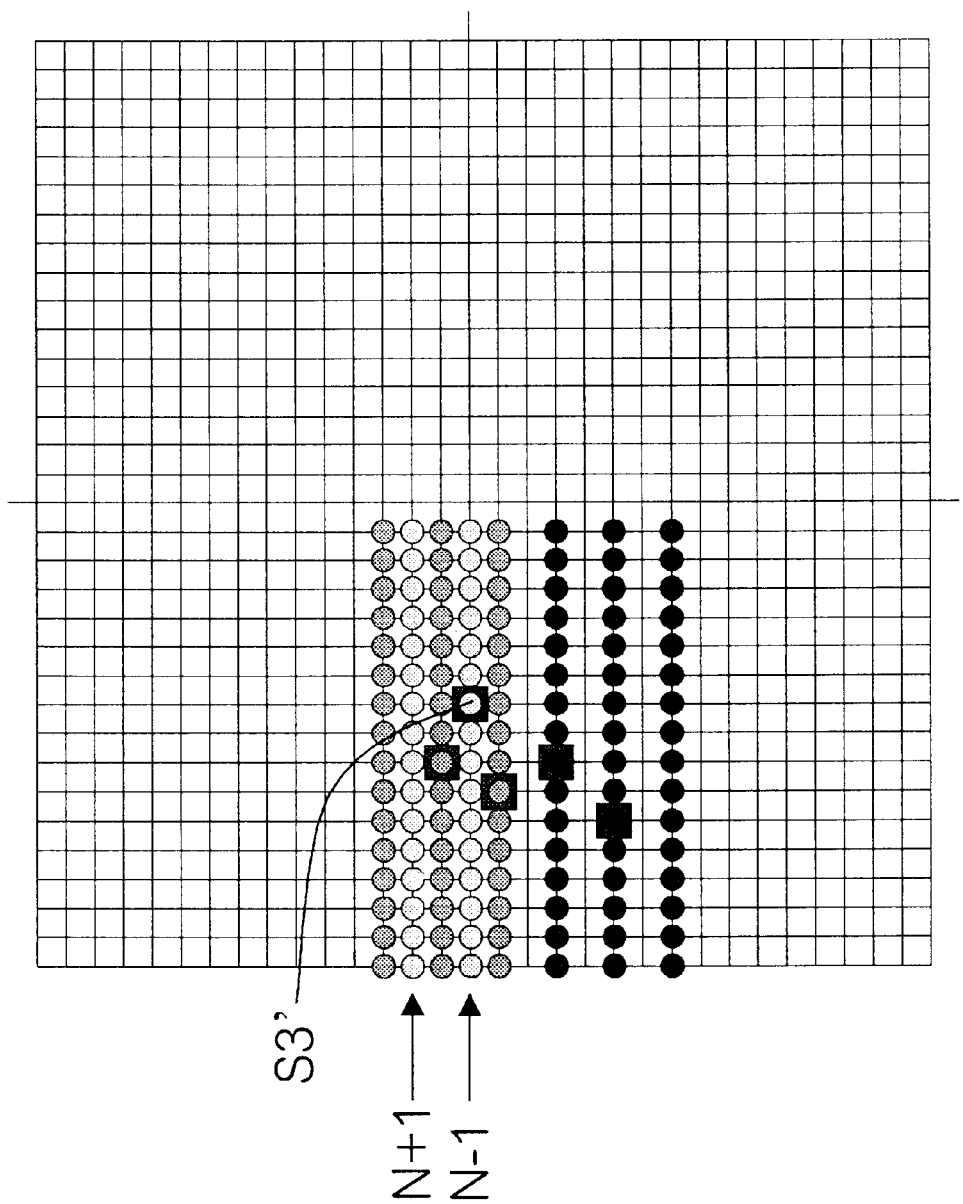
FIG. 7 illustrates an example, corresponding to FIG. 6F, to which another embodiment of the video coding motion estimation according to the invention is applied.

On the other hand, in the embodiment above, rows in a window are searched as units for choosing checking points, but it is not a limitation of the method according to the invention. In another search technique for motion estimation according to the invention, a set of consecutive points of each row can be chosen as checking points. Referring to FIG. 7, it illustrates an example, corresponding to FIG. 6F, to which another embodiment of the video coding motion estimation according to the invention is applied. In this example, the method for motion estimation performs in the same way as the previous embodiment except that checking points are chosen from 16 consecutive points in each row. For the sake of brevity, in FIG. 7, it only illustrates the method performed in the stage corresponding to the stage for the previous embodiment as shown in FIG. 6F, where the first 16 consecutive points of the (N+1)-th and (N−1)-th rows are chosen and the checking point S3' is finally determined as the candidate checking point for use in determination of the motion vector for a block in a current frame being coded. According to the invention, choosing a set of consecutive points in each row has an advantage of reducing the amount of computational operations, thus lowering complexity.

As disclosed above, the embodiments of the method for video coding motion estimation according to the invention achieve the objects of high quality, and low complexity, and providing capability of reuse data, and compliance to hardware speed-up functions supported by media processors.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for motion estimation for use in video coding when a first block in a current frame is being coded, the method being used for searching for a second block in a previous frame matching the first block in the current frame, the second block being used for determining a motion vector, in a predetermined search region, for the first block, the predetermined search region having a plurality of rows, the plurality of rows including an (N−2)-th row, an (N−1)-th row, an N-th row, an (N+1)-th row, and an (N+2)-th row, each of the plurality of rows having a plurality of points, wherein a prediction point is on the N-th row, the method comprising the steps of:

(a) choosing all points of the (N−2)-th row, the N-th row, the N-th row, and the (N+2)th row as checking points;

(b) calculating block match errors for the checking points and defining a checking point which corresponds to a minimum block match error as a candidate checking point;

(c) determining whether the candidate checking point is on the N-th row; if the candidate checking point is on the N-th row, proceeding to step (g); otherwise, proceeding to step (d);

(d) determining whether the candidate checking point is on the (N+2)-th row; if the candidate checking point is on the (N+2)-th row, proceeding to step (e); otherwise, proceeding to step (t);

(e) incrementing N by two, choosing all points of the (N+2)-th row as checking points, and repeating the step (b);

(f) decrementing N by two, choosing all points of the (N−2)-th row as checking points, and repeating the step (b); and (g) choosing all points of the (N−1)-th and the (N+1)-th rows as checking points, calculating block match errors for the checking points, and defining a checking point corresponding to the minimum block match error as the candidate checking point, wherein the candidate checking point corresponds to the second block and is used for determining the motion vector for the first block.

2. A method according to claim 1, wherein, in the step (b), calculating the block match error for the checking point comprises the steps of:

calculating differences in image information of all pixels between a block corresponding to the checking point in the previous frame and the first block; and summing up all absolute values of the differences, resulting in the block match error for the checking point.

3. A method according to claim 1, wherein the prediction point is obtained by using a motion vector corresponding to a block which is near the first block and has been coded.

4. A method for motion estimation for use in video coding when a first block in a current frame is being coded, the method being used for searching for a second block in a previous frame which matches the first block in the current frame, the second block being used for determining a motion vector, in a predetermined search region, for the first block, the predetermined search region having a plurality of rows and a plurality of columns, the plurality of rows including an (N−2)-th row, an (N−1)-th row, an N-th row, an (N+1)-th row, and an (N+2)-th row, each of the plurality of rows having a plurality of points, wherein a prediction point is on the N-th row and the prediction point is obtained by using a motion vector corresponding to a block which is near the first block and has been coded, the method comprising the steps of (a) choosing a set of consecutive points of the (N−2)-th row, the N-th row, and the (N+2)-th row as checking points, wherein the set of consecutive points includes the prediction point;

(b) calculating block match errors for the checking points and defining a checking point corresponding to a minimum block match error as a candidate checking point;

(c) determining whether the candidate checking point is on the N-th row; if the candidate checking point is on the N-th row, proceeding to step (g); otherwise, proceeding to step (d);

(d) determining whether the candidate checking point is on the (N+2)-th row; if the candidate checking point is on the (N+2)-th row, proceeding to step (e); otherwise, proceeding to step (f);

(e) incrementing N by two, choosing a set of consecutive points of the (N+2)-th row as checking points, and repeating the step (b);

(f) decrementing N by two, choosing a set of consecutive points of the (N−2)-th row as checking points, and repeating the step (b); and (g) choosing a set of consecutive points of the (N−1)-th and the (N+1)-th rows as checking points and defining a checking point corresponding to the minimum block match error as the candidate checking point, wherein the candidate checking point corresponds to the second block and is used for determining the motion vector the first block.

5. A method according to claim 4, wherein, in the step (b), calculating the block match error for the checking point comprises the steps of:

calculating differences in image information of all pixels between a block corresponding to the checking point in the previous frame and the first block; and summing up all absolute values of the differences, resulting in the block match error for the checking point.

* * * * *